(12) United States Patent
Zaruba et al.

(10) Patent No.: US 8,774,795 B2
(45) Date of Patent: Jul. 8, 2014

(54) RECONFIGURABLE SATCOM AVIONICS RADIO

(75) Inventors: Radek Zaruba, Decin (CZ); Petr Kanovsky, Tupesy (CZ)

(73) Assignee: Honeywell International Inc., Morristown, NJ (US)

( * ) Notice: Subject to any disclaimer, the term of this patent is extended or adjusted under 35 U.S.C. 154(b) by 266 days.

(21) Appl. No.: 13/218,548

(22) Filed: Aug. 26, 2011

(65) Prior Publication Data

US 2012/0295537 A1  Nov. 22, 2012

Related U.S. Application Data

(60) Provisional application No. 61/488,504, filed on May 20, 2011.

(51) Int. Cl.
  *H04W 4/00*  (2009.01)
  *H04B 1/034*  (2006.01)

(52) U.S. Cl.
  USPC ............................ 455/431; 455/98; 343/705

(58) Field of Classification Search
  USPC ............ 455/3.03, 12.1, 13.2, 98, 427, 404.1, 455/404.2, 456.1, 431; 343/705
  See application file for complete search history.

(56) References Cited

U.S. PATENT DOCUMENTS

| | | | |
|---|---|---|---|
| 5,867,535 A | 2/1999 | Phillips | |
| 5,909,193 A | 6/1999 | Phillips | |
| 6,072,994 A | 6/2000 | Phillips | |
| 7,620,127 B1 | 11/2009 | Koenck et al. | |
| 7,675,852 B1 | 3/2010 | Arundale et al. | |
| 7,941,248 B1 | 5/2011 | Tsamis | |
| 2006/0287001 A1* | 12/2006 | Budampati et al. | 455/552.1 |
| 2007/0271314 A1* | 11/2007 | Ban et al. | 707/202 |
| 2008/0009239 A1* | 1/2008 | Nguyen et al. | 455/3.02 |
| 2008/0102824 A1* | 5/2008 | Kauffman | 455/431 |
| 2009/0102657 A1* | 4/2009 | Evans et al. | 340/572.1 |
| 2009/0271054 A1* | 10/2009 | Dokken | 701/21 |
| 2009/0326782 A1* | 12/2009 | Nunn | 701/100 |
| 2010/0001678 A1* | 1/2010 | Potter et al. | 318/569 |

OTHER PUBLICATIONS

European Patent Office, "Office Action", "from Foreign Counterpart of U.S. Appl. No. 13/218,548", filed Dec. 20, 2012, pp. 1-5, Published in: EP.
European Patent Office, "European Search Report", "from Foreign Counterpart of U.S. Appl. No. 13/218,548", filed Dec. 6, 2012, pp. 1-3, Published in: EP.
"STAR Project", "Accessed on Aug. 10, 2011; www.ist-star.eu/", Aug. 10, 2011, pp. 1-3.

\* cited by examiner

*Primary Examiner* — Dominic E Rego
(74) *Attorney, Agent, or Firm* — Fogg & Powers LLC

(57) ABSTRACT

In one embodiment, a main radio unit for an avionic communication system is provided. The main radio unit includes a software defined radio (SDR) configured to simultaneously provide at least one safety certified channel for a cockpit of an aircraft and at least one other channel for cabin services of the aircraft, wherein the SDR is configurable such that the SDR can generate signals corresponding to different communication protocols. The main radio unit also includes an interface for the at least one safety certified channel, wherein the interface is configured to convert signals between a protocol for hardware in the cockpit and a satellite communication protocol used by the SDR for the at least one safety certified channel; and wherein the SDR is configured to communicate with an RF unit for transmission and reception of signals over an antenna.

14 Claims, 3 Drawing Sheets

RECONFIGURABLE SATCOM AVIONICS RADIO

CROSS-REFERENCE TO RELATED APPLICATIONS

This application claims the benefit of priority to U.S. Provisional Application No. 61/488,504, filed on May 20, 2011, the disclosure of which is incorporated herein by reference.

BACKGROUND

Multiple satellite communication (Satcom) systems are available for use by airspace users including Inmarsat, Iridium, Thuraya, and others. At the present time most of these systems are available only for non-safety critical applications such as internet or phone call connectivity for aircraft passengers. Consequently, aircraft operating in oceanic and polar routes are typically equipped with legacy high frequency (HF) radios which can add volume and weight to the aircraft equipment. At the same time SESAR and NextGen programs are defining a new air traffic management (ATM) environment where safety critical data connectivity between aircraft and ground will be substantial. In response to this, existing Satcom systems (e.g., Thuraya, Iridium) are pursuing certification for safety critical aerospace applications and other new systems are in early development stages. Additionally, new non-safety critical data services are being added to the existing and new Satcom systems. For example, an increased number of Inmarsat SBB channels per aircraft are being offered, Thuraya is trying to enter the market as Inmarsat competition, Iridium has started development of NEXT, and Ku and Ka band Satcom solutions considered for broadband services.

SUMMARY

In one embodiment, a main radio unit for an avionic communication system is provided. The main radio unit includes a software defined radio (SDR) configured to simultaneously provide at least one safety certified channel for a cockpit of an aircraft and at least one other channel for cabin services of the aircraft, wherein the SDR is configurable such that the SDR can generate signals corresponding to different communication protocols. The main radio unit also includes an interface for the at least one safety certified channel, wherein the interface is configured to convert signals between a protocol for hardware in the cockpit and a satellite communication protocol used by the SDR for the at least one safety certified channel; and wherein the SDR is configured to communicate with an RF unit for transmission and reception of signals over an antenna.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
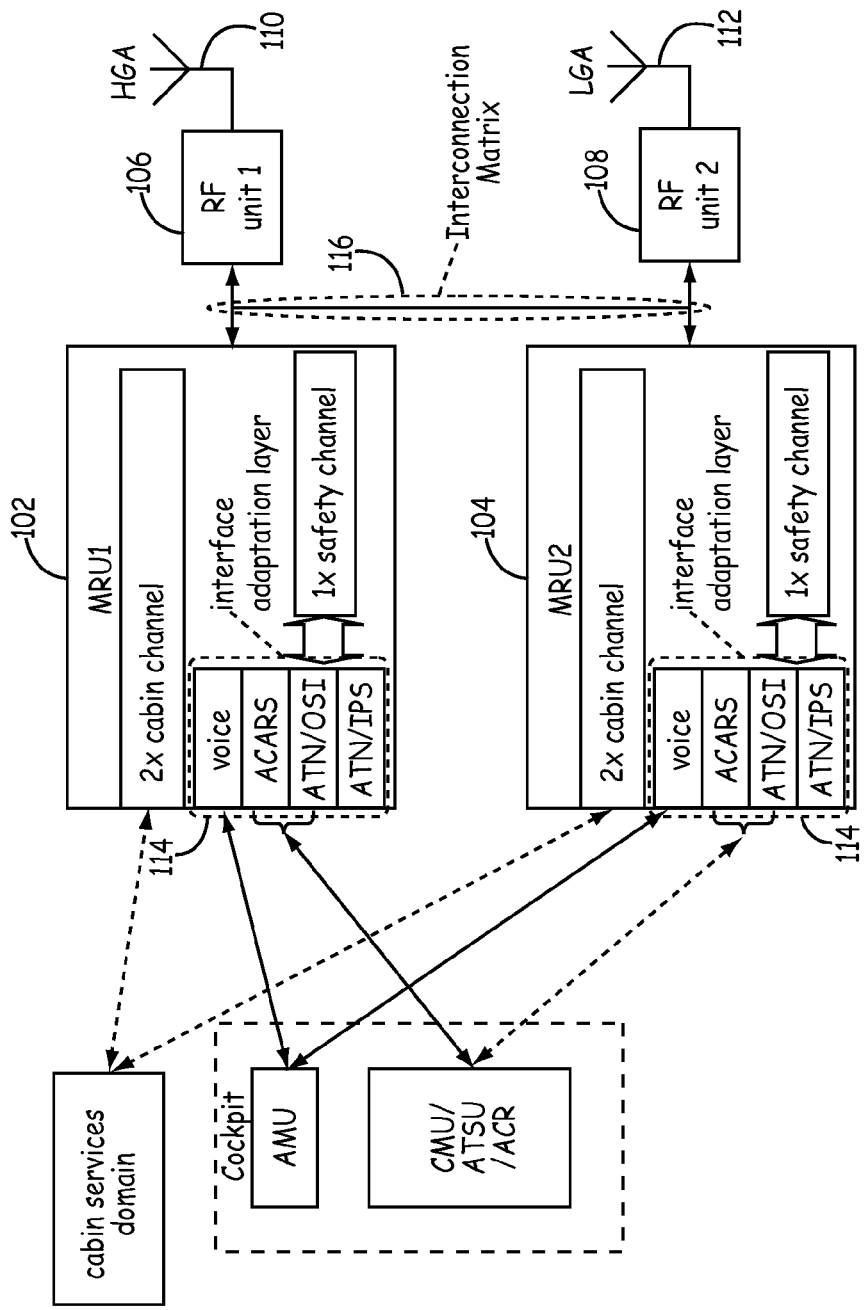
FIG. 1 illustrates an example of an avionics system supporting multiple Satcom protocols.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The subject matter described herein provides a system for efficient implementation of Satcom avionics supporting both the safety and non-safety services. This system is configurable such that it can be operated in accordance with different Satcom communication systems. Ideally, some examples of this system can be available through all the existing and future Satcom systems. In some examples, the system utilizes software defined radio (SDR) technology to implement a multi-protocol Satcom system for avionics. In some examples, this system maintains separation between the safety and non-safety domains as required by airframers and system integrators.

FIG. 1 illustrates an example of an avionics system 100 supporting multiple Satcom protocols. The avionics system 100 can be configured to be installed in an aircraft and provide communication for the aircraft to and from remote (e.g., ground based) entities through a plurality of Satcom systems. The avionics system 100 can be configurable to communicate with a plurality of different Satcom systems. That is, in a first configuration the avionics system 100 can process a waveform for communication with a first Satcom system, and in a second configuration the avionics system 100 can process a waveform for communication with a second Satcom system. Additionally, in some examples, the system 100 can be configured to communicate with multiple Satcom systems simultaneously. For example, cabin channels can be configured to communicate via an Inmarsat system and cockpit safety channels can be configured to communicate via a safety Satcom system (e.g., future Iris).

In an example, the system 100 can include one or more main radio units. The example shown in FIG. 1 includes a first main radio unit (MRU) 102 and a second MRU 104. The first and second MRUs 102, 104 can be configured to communicate with a cabin services domain and a cockpit of an aircraft. The first and second MRUs 102, 104 can also communicate with one or more RF units 106, 108. An RF unit 106, 108 can be located proximally to an antenna (e.g., antenna 110, 112 respectively) to which the RF unit 106, 108 is coupled.

An MRU 102, 104 can include hardware and software for generating and receiving radio signals according to Satcom protocols. In an example, the MRU 102, 104 can generate radio signals based on signals received from devices in the cockpit as well as based on signals received from devices in the cabin. As known, devices in the cockpit can correspond to controls and communications to operate the aircraft and, as such, communication (e.g., Satcom) channels serving those devices are considered critical safety channels. As safety critical channels, these channels typically need to be certified to a higher design assurance level in order to be approved for operation with the aircraft. The higher assurance level can make the development of any related hardware and software significantly more complex and expensive. These safety critical channels that require high certification are also referred to herein as a "safety certified channel". Devices in the cabin, however, typically correspond to passenger uses and, as such, are not critical for operation of the aircraft and are typically required to be certified to lower design assurance levels (e.g., to prove that it will not interfere with other onboard equipment).

The MRU 102, 104 can provide one or more channels that are dedicated to safety critical services (e.g., the cockpit). Having one or more dedicated channels for safety critical services can help ensure that the non-safety critical services don't use all the available bandwidth at the expense of the safety critical services. One or more separate channels from the one or more safety critical channels can be provided for non-safety critical services (e.g., cabin services). These "channels" are communication channels of an external network from the system 100 with which the system 100 is communicating. In an example, the channels are channels of a satellite communication (Satcom) network (e.g., Inmarsat, Iridium, Iris, Thuraya, MTSAT).

As mentioned above, an MRU 102, 104 in combination with an RF unit 106, 108 can be configurable to process radio signals in accordance with different Satcom protocols. In an example, the MRU 102, 104 is a highly configurable (e.g., adjustable) component and the RF unit 106, 108 may also have some configurability, although generally to lesser extent than the MRU 102, 104. In an example, configurability of the MRU 102, 104 can include waveform selection and channel configuration. The MRU 102, 104 can support (e.g., be configurable to operate in accordance with) any one or more suitable Satcom protocols including protocols conforming to the following systems: Inmarsat, Iridium, Thuraya, and MTSAT as well as future system such as Iris and Iridium NEXT.

For example, to a first configuration, the MRU 102, 104 can process signals in accordance with a first Satcom protocol (e.g., for the Inmarsat system). In a second configuration, the MRU 102, 104, can process signals in accordance with a second Satcom protocol (e.g., for the Iridium system). Thus, the MRU 102, 104 can be configured to process signals in accordance with the first Satcom protocol at a first time (e.g., during a first leg of a flight) and the MRU 102, 104, can be reconfigured to process signals in accordance with a second Satcom protocol at a second time (e.g., during a second leg of the flight). Moreover, as mentioned above, the MRU 102, 104 can be configured to process different Satcom system waveforms simultaneously.

The configurability of the RF unit 106, 108 can include selection of transmit and receive radio frequencies and selection of output power based on the configuration (e.g., the Satcom protocol being processed) of the MRU 102, 104 with which the RF unit 106, 108 is communicating. In some examples, configurability of the RF unit 106, 108 can include selecting a path based on the type of waveform being sent. For example, Inmarsat and Iris systems may use an output diplexer to split the receive and transmit frequency bands, while Iridium uses time division duplex and may use a transmit/receive switch instead.

To transmit a signal, the MRU 102, 104 can generate signals corresponding to a Satcom protocol based on data (e.g., signals) received from the cockpit, cabin services, or both. These signals can be provided to an RF unit 106, 108. From the signals received from the MRU 102, 104, the RF unit 106, 108 can generate a radio signal for propagation from the associated antenna 110, 112.

The system 100 can operate in a corresponding manner in the receiving direction. For example, the RF unit 106, 108 can initially process radio signals sensed at an associated antenna 110, 112. The RF unit 106, 108 can then provide the signals to an MRU 102, 104 for further processing and reception of the signals. After processing and receiving the signals, the MRU 102, 104 can provide data (e.g., signals) to devices in the cockpit and/or cabin based on the processed signals.

As mentioned above, the MRU 102, 104 and associated RF unit 106, 108 together can include the hardware and software used to transmit and receive the radio signals. The functionality distribution between the MRU 102, 104, and the RF unit 106, 108 can be different in different embodiments. In a first example, the RF unit 106, 108 can include frequency filters and low noise amplifiers and the MRU 102, 104 can include all the remaining hardware and software for transmitting and receiving signals. In this first example, the signals between the MRU 102, 104 and the RF units 106, 108 are analog. In another example, the RF unit 106, 108 can include the hardware for the entire analog signal path and the MRU 102, 104 can include the hardware and software for processing the digitized signal. In this example, the signals between the MRU 102, 104 and the RF unit 106, 108 can be either digital or analog depending on where the digitization occurs.

In an example, an MRU 102, 104 can be selectively coupled to one or more of a plurality of RF units 106, 108 as shown in FIG. 1. An interconnection matrix 116 can be used to control which of the one or more RF units 106, 108 the MRU 102, 104 are coupled to. The interconnection matrix 116 can include a plurality of communication mediums (e.g., digital optical cables) and a plurality of switches for communicatively coupling the MRU 102, 104 to the appropriate RF unit 106, 108. The switches and communication mediums can be configured to operate in accordance with analog or digital signals as appropriate.

As an example, multiple RF units 106, 108 can be used in order to provide operational redundancy and/or can be used to connect to different antennas 110, 112. For example, as mentioned above, the first RF unit 106 can be coupled to a first antenna 110 and the second RF unit can be coupled to a second antenna 112. The first antenna 110 can be a steerable antenna (e.g., a directional high gain antenna or a directional intermediate gain antenna) and the second antenna 112 can be an omni-directional low gain antenna. Accordingly, an MRU 102, 104 having a current configuration that produces a signal to be transmitted from a steerable antenna (e.g., a signal conforming to a GEO system such as Inmarsat, Thuraya, Iris baseline) can be coupled by the interconnection matrix 116 to the RF unit 106 which is coupled to the steerable antenna 110. Likewise, an MRU 102, 104 having a current configuration that produces a signal to be transmitted from an omni-directional low gain antenna can be coupled by the interconnection matrix 116 to the RF unit 108 which is coupled to the low gain antenna 112. Example Satcom signals for transmission over a low gain antenna include signals conforming to a non-GEO system such as Iridium or possible Iris complementary systems), or a signal conforming to a GEO constellations supporting low gain antenna operation. Additionally, for operational redundancy if the steerable antenna 110 or associated RF unit 106 fail, communication can be supported through the RF unit 108 and the low gain antenna 112 and vice versa. Additionally, cabin service and cockpit service can be provided simultaneously over different antennas 110, 112. For example, cabin services can use the steerable antenna 110 and the cockpit service can be provided through the low gain antenna 112. In some examples, the RF unit 106, 108 can be integrated close to an associated antenna 110, 112. Additionally, in some examples, an RF unit 106, 108 may be dedicated to one or more bands to the exclusion of other bands; and different RF unit 106, 108 can cover different bands. Accordingly, an aircraft owner can install only selected RF units 106, 108 according to needs. In an example, a third RF unit can be included and coupled to, for example, the low gain antenna 112. In this example, the third RF unit can operate on one or more different frequency bands than the second RF unit 108. In order to use the low gain antenna 112, the interconnection matrix 116 can couple an MRU 102, 104 to the second RF unit 108 or third RF unit based on the frequency bands for which the MRU 102 104 is configured.

In an example, the RF unit 106, 108 and/or the MRU 102, 104 can be a line replaceable unit (LRU) or an integrated modular avionic (IMA) module. Accordingly, both the first MRU 106 and the second MRU 108 can be identical and can be provided for operational redundancy.

The first and second MRUs 102, 104 can be coupled to the cabin services domain (e.g., non-safety services) through an appropriate interface (e.g., an Ethernet based interface). The cabin services domain can include one or more passenger devices that can be communicatively coupled with the MRU 102, 104 through, for example, a cabin router. These passenger devices can include in-flight phones, mobile devices (e.g., laptops, tablets, mobile phones, personal digital assistants (PDAs)) and other devices. The cabin services domain can also include built-in flight entertainment, video, radio, games, etc. In an example, each of the cabin services channels can be independently configured to one of a plurality of Satcom networks to be used for cabin services.

The one or more channels in an MRU 102, 104 that are dedicated to the cockpit (e.g., safety services) can be coupled to the cockpit through an appropriate interface 114 (e.g., an adaptation layer). These channels can also be configured to one of a plurality of Satcom networks used for cockpit (e.g., safety critical) services. In an example, the cockpit interface 114 can convert between a Satcom subnewtork data format for the Satcom network with which the MRU 102, 104 is communicating and an avionic interface format corresponding to the device in the cockpit to which the data is going to or coming from. For interfacing to legacy cockpit avionics this may include, for example, conversion of Inmarsat SBB, Thuraya, or Iridium IP packets to Arinc 429/618 ACARS avionic interface. In some examples, the interface 114 can convert between voice signals and the Satcom data for operation with an audio management unit (AMU). The interface 114 can also convert between an airborne communication addressing and reporting system (ACARS), an aeronautical telecommunication network/open systems interconnection (ATN/OSI) or an ATN/internet protocol suite (ATN/IPS) and the Satcom network data. This can enable operation with a communications management unit (CMU) or other aircraft equipment implementing similar data management functionality (e.g., an air traffic services unit (ATSU), or an aircraft communications router (ACR)). More or less application layers than that shown in FIG. 1 can be implemented in the MRU 102, 104. In an example, the interface 114 can be a reconfigurable and/or interchangeable module to allow easy customization for a particular aircraft and/or protocol.

In case of any single box failure (e.g., MRU 102, 104, RF unit 106, 108) the system 100 will still provide at least 2 cabin and 1 cockpit channels (assuming they can be supported with a low gain antenna in given area, which should be true for Iridium, Iris (cockpit only) and Thuraya). Although the above description and FIG. 1 relate to two MRUs and two RF units, additional MRUs and/or RF units can be included in a particular system.

In an example, the system 100 can be configured to cover all the existing and planned LBand Satcom systems (e.g., Inmarsat, Iridium, Iris, Thuraya). For example, when communication over the Inmarsat system is requested, one (or both) of the MRUs 102, 104 can be configured (e.g., by loading appropriate software) for the Inmarsat system and output signals to the RF unit 106 that corresponds with the Inmarsat system. When, at a later time, communication over Iridium is requested, one (or both) of the MRUs 102, 104 can be re-configured to process signals corresponding to the Iridium system.

This can enable systems 100 to be provided that can be configured for use with different Satcom systems (e.g., for communication over a different protocol). Thus, a first airspace user can configure a first system 100 to operate in accordance with a first Satcom system and a second user can configure a second system 100 (identical to the first system) to operate in accordance with a second Satcom system. Moreover, a single system 100 can be re-configured during or between flights for use with a different Satcom system such that, for example, an aircraft can provide different services in different areas based on availability and/or cost. For example, a flight from the US to the Middle East may benefit from using the Inmarsat SBB services in the Atlantic region, but Thuraya may become a cheaper option in the Middle East area. Furthermore, the system 100 can be easily upgraded to support new Satcom systems available in the future.

In an example, the radio functionality implemented by the MRU 102, 104 can be either as combination of software and programmable hardware functions in a software defined radio (SDR) based system as described with reference to FIG. 2 and/or as combination of third-party hardware modules as described with reference to FIG. 3.

Figure 2:
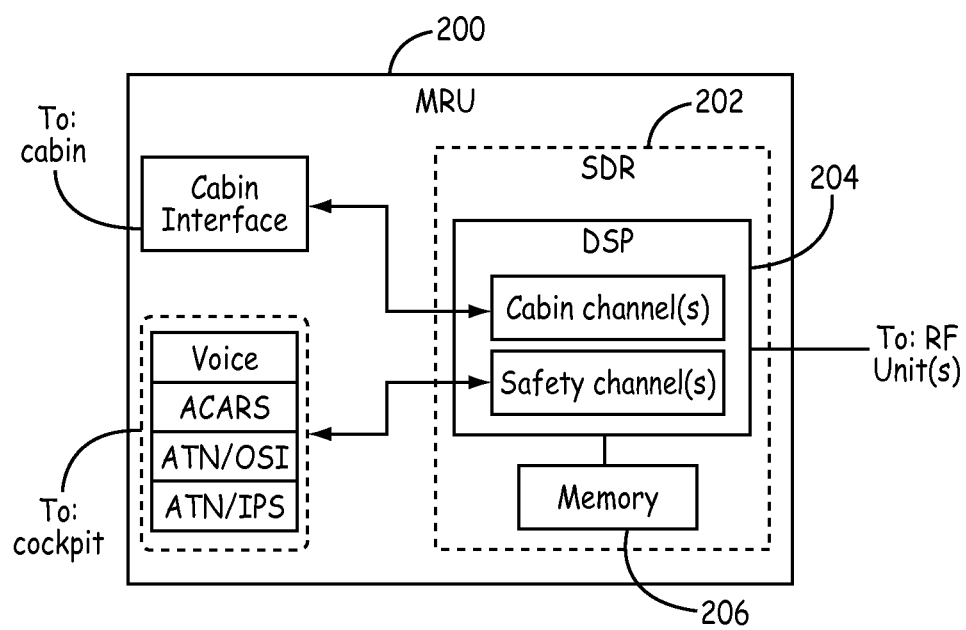
FIG. 2 illustrates an example of a main radio unit from FIG. 1 implemented with a software defined radio.

FIG. 2 illustrates an example of a MRU 200 that includes a software defined radio (SDR) 202 to implement a radio that is configurable to different Satcom protocols. In this example, the MRU 200 comprises a flexible SDR platform and the waveforms conforming to one or more Satcom protocols can be ported on this platform. In an example, the platform is open such that the owners of the waveforms can program or provide software for the SDR 202 to implement their waveform (s).

The SDR 202 can include any suitable hardware with appropriate software. For example, the SDR 202 can include one or more processing units 204 (e.g., a digital signal processor (DSP)) that can be coupled to one or more memory units 206. The memory 206 can include instructions which, when executed by the processing unit 204, causes the processing unit 204 to implement the functions of an SDR. The SDR 202 can function in coordination with hardware in an RF unit 106, 108 to transmit and receive signals corresponding to a selected Satcom protocol.

In order to configure the SDR 202 with a selected Satcom protocol, appropriate instructions can be stored in the memory 206. For example, the instructions can cause the one or more processing units 204 to implement a communication protocol corresponding to a particular Satcom system. In an example, the one or more processing units 204 can include a microprocessor, a microcontroller, a digital signal processor, field programmable gate array (FPGA), etc. The one or more memory devices 206 can include any appropriate processor readable medium used for storage of processor readable instructions or data structures. The SDR unit 102, 104, can also include the appropriate hardware to produce the signals for providing to the RF units 106, 108.

These instructions can be stored on any appropriate processor-readable medium used for storage of computer readable instructions or data structures. The processor-readable media can be implemented as any available media that can be accessed by a general purpose or special purpose computer or processor, or any programmable logic device. Suitable processor-readable media can include tangible media, such as storage or memory media, and transmission media such as electrical, electromagnetic, or digital signals, conveyed via a communication medium such as a network and/or a wireless link.

Storage or memory media can include magnetic or optical media, such as conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

To configure (or re-configure) the SDR 202 to operate in accordance with a particular Satcom protocol, software in the memory 206 corresponding to the particular Satcom protocol can be activated by the MRU 200 for execution by the one or more processing units 204. In an example, the memory 206 can include instructions corresponding to multiple different Satcom protocols. In this example, the MRU 200 can be dynamically configured to operate in accordance with a selected Satcom protocol. For example, instructions corresponding to both the Inmarsat and Iridium systems can be stored in the memory 206 in order to configure the MRU 200 to alternatively and/or simultaneously operate in accordance with the Inmarsat and Iridium systems. To configure the MRU 200 for operation with Inmarsat, the instructions corresponding to Inmarsat are activated for execution on the one or more available cabin and/or safety channels implemented in the one or more processing devices 204. To configure the MRU 200 for operation with Iridium systems, the instructions corresponding to Iridium systems are activated for execution on the one or more available cabin and/or safety channels implemented in the one or more processing devices 204. These configurations can be performed alternatively, or simultaneously for different channels such that the MRU 200 can be configured to operate in accordance with a first Satcom protocol on selected channels and simultaneously operate in accordance with a second Satcom protocol on the other available channels.

In other examples, the MRU 200 may only include instructions corresponding to a single Satcom protocol. The configurability of SDR 202, however, enables multiple identical (or similar) MRUs 200 to be built and then individually configured in accordance with the Satcom system corresponding to the aircraft in which the particular MRU 200 is to be installed. Accordingly, a plurality of similar MRUs 200 can be built and then each MRU 200 can be customized to operate in accordance with one or more selected Satcom systems as desired.

As shown in FIG. 2, the MRU 200 can also include an interface (e.g., interface adaptation layer) for converting between the Satcom protocol and the signals for the cockpit devices. This interface can operate substantially similar to interface 114 as described with respect to FIG. 1 by interacting with the SDR 202 and the devices in the cockpit.

Figure 3:
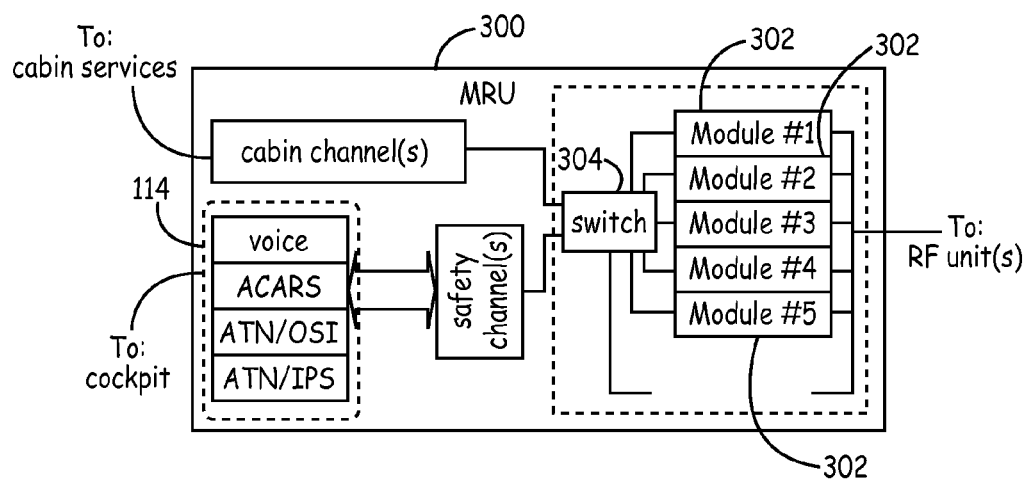
FIG. 3 illustrates another example of a main radio unit from FIG. 1 implemented as a combination of hardware modules.

FIG. 3 illustrates another example of an MRU 300 that includes one or more modules 302 for configuring the MRU 300 to operate in accordance with one or more Satcom protocols. A module 302 can be physically installed in and removed from the MRU 300. This modular hardware solution can be implemented by purchasing from the "waveform owners" the elementary transceiver components (e.g., chipsets) for transmitting and receiving their respective waveform. These transceiver components are then formed into modules 302 for the MRU 300 and the modules 302 can be integrated into the MRU 300 for configuration to operate in accordance with the given waveform.

In an example, the MRU 300 can have multiple modules 302 simultaneously installed therein in order to enable dynamic switching between different Satcom protocols. In this example, to configure the MRU 300 to operate in accordance with a first Satcom protocol a switch 304 can selectively couple the interface 114 and/or the cabin services channel to the appropriate module 302. In another example, the MRU 300 can have a single module 302 installed therein. The module enabled configurability of MRU 300 can enable identical (or similar) MRUs 300 to be built and then set-up in accordance with the Satcom system corresponding to the aircraft in which the particular MRU 300 is to be installed. Accordingly, a plurality of similar MRUs 300 can be built and then each MRU 300 can be customized to operate in accordance with one or more selected Satcom systems by installation of the corresponding modules 302.

In an example, a module 302 can include most or all hardware to implement the transmit/receive radio functionality of the MRU for the particular Satcom protocol. In another example, the MRU 300 can include shared hardware 306 that can be used by one or more modules 302 installed therein. In an example, the MRU 300 can include the following shared hardware 306: one or more power supplies, reference clocks, avionic and antenna interfaces and control logic. In this example, the modules 302 can include the other hardware to implement the specific Satcom protocol for that module 302.

As shown in FIG. 3, the MRU 300 can also include an interface 114 for converting between the Satcom protocol and the signals for the cockpit devices. This interface 114 can operate substantially as described with respect to FIG. 1 by interacting with the modules 302.

In yet another example, a reconfigurable main radio unit can include both an SDR (e.g., SDR 202) as discussed with respect to FIG. 2 and one or more hardware modules (e.g., modules 302) as discussed with respect to FIG. 3. For example, a first and second Satcom protocols (e.g., for Inmarsat and Iris) could be implemented in the SDR and a third Satcom protocol (e.g., for Iridium) could be implemented as a $3^{rd}$ party hardware module. Thus, the main radio unit is configurable by either software in the SDR or by adding a hardware module to implement the desired functionality.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics system comprising:
   a first main radio unit (MRU) configurable to simultaneously provide at least one safety certified channel for a cockpit of an aircraft and at least one other channel for cabin services of the aircraft with a software defined radio (SDR);
   a second main radio unit (MRU) configurable to simultaneously provide at least one safety certified channel for a cockpit of an aircraft and at least one other channel for cabin services of the aircraft with a software defined radio (SDR);
   a first RF unit configured to selectively communicate with one of the first MRU and the second MRU and send and receive signals from a first antenna, wherein the first RF unit is configured to amplify first outgoing signals from one of the first MRU and the second MRU and send the first outgoing signals to the first antenna for propagation therefrom as well as filter first incoming signals from the first antenna and send the first incoming signals to one of the first MRU and the second MRU for processing; and a second RF unit configured to selectively communicate with one of the first MRU and the second MRU and send and receive signals from a second antenna, wherein the second RF unit is configured to amplify second outgoing signals from one of the first MRU and the second MRU and send the second outgoing signals to the second antenna for propagation therefrom as well as filter second incoming signals from the second antenna and send the second incoming signals to one of the first MRU and the second MRU for processing.

2. The avionics system of claim 1, wherein the first MRU and the second MRU are configurable to process signals in accordance with different satellite communication protocols.

3. The avionics system of claim 2, wherein the different communication protocols include protocols conforming to any of the following systems: Inmarsat, Iridium, Thuraya, MTSAT, as well as future Satcom systems such as Iris and Iridium NEXT.

4. The avionics system of claim 1, wherein the first antenna comprises a steerable antenna and the second antenna comprises an omni-directional low gain antenna.

5. The avionics system of claim 1, wherein the first MRU includes:
a first interface adaptor layer configured to interface with a plurality of cockpit avionic interfaces;
wherein the second MRU includes:
a second interface adaptor layer configured to interface with the plurality of cockpit avionic interfaces;
wherein the first MRU and the second MRU are configured to send and receive signals with the plurality of cockpit avionic interfaces and in conjunction with one of the first RF unit and the second RF unit transmit and receive signals corresponding thereto.

6. The avionics system of claim 5, wherein the plurality of cockpit avionic interfaces include one or more of: voice, airborne communication addressing and reporting system (ACARS), aeronautical telecommunication network (ATN)/open systems interconnection (OSI), and ATN/internet protocol suite (IPS).

7. The avionics system of claim 6, wherein the first and second interface adaptor layer is configured to convert packets between a satellite communication protocol and a protocol for hardware in the cockpit including an audio management unit (AMU) and a communications management unit (CMU).

8. The avionics system of claim 1, comprising:
an interconnection matrix coupled between the first and second MRU and the first and second RF unit, the interconnection matrix configured to selectively couple the first MRU to one of the first or second RF unit and to selectively couple the second MRU to one of the first or second RF unit.

9. The avionics system of claim 8, wherein the interconnection matrix includes one of a plurality of analog switches or a plurality of digital switches.

10. The avionics system of claim 1, comprising:
a third RF unit configured to selectively communicate with one of the first MRU and the second MRU, the third RF unit configured to amplify third outgoing signals from one of the first MRU and the second MRU and send the third outgoing signals to the second antenna for propagation therefrom as well as filter third incoming signals from the second antenna and send the third incoming signals to one of the first MRU and the second MRU for processing, wherein the second RF unit and the third RF unit are configured to operate on different bands.

11. The avionics system of claim 1, wherein the at least one other channel communicates with cabin services through an Ethernet based interface.

12. An avionics system comprising:
a first reconfigurable radio unit configurable to simultaneously provide at least one safety certified channel for a cockpit of an aircraft and at least one other channel for cabin services of the aircraft;
a second reconfigurable radio unit configurable to simultaneously provide at least one safety certified channel for a cockpit of an aircraft and at least one other channel for cabin services of the aircraft;
a first RF unit configured to selectively communicate with one of the first reconfigurable radio unit and the second reconfigurable radio unit and send and receive signals from a first antenna, wherein the first RF unit is configured to amplify first outgoing signals from one of the first reconfigurable radio unit and the second reconfigurable radio unit and send the first outgoing signals to the first antenna for propagation therefrom as well as filter first incoming signals from the first antenna and send the first incoming signals to one of the first reconfigurable radio unit and the second reconfigurable radio unit for processing; and
a second RF unit configured to selectively communicate with one of the first reconfigurable radio unit and the second reconfigurable radio unit and send and receive signals from a second antenna, wherein the second RF unit is configured to amplify second outgoing signals from one of the first reconfigurable radio unit and the second reconfigurable radio unit and send the second outgoing signals to the second antenna for propagation therefrom as well as filter second incoming signals from the second antenna and send the second incoming signals to one of the first reconfigurable radio unit and the second reconfigurable radio unit for processing.

13. The avionics system of claim 12, wherein the first reconfigurable radio unit includes one of a software defined radio (SDR) and a plurality of satellite communication modules;
wherein the SDR is configurable such that the at least one safety certified channel and the at least one other channel can be individually set to one of a plurality of satellite communication protocols;
wherein the plurality of satellite communication modules includes a first module for implementing a first satellite communication protocol and a second module for implementing a second satellite communication protocol.

14. The avionics system of claim 12, comprising:
an interconnection matrix configured to route signals between the first and second reconfigurable radio unit and the first and second RF unit; and wherein the first antenna includes a low gain omni-directional antenna, and the second antenna includes a steerable directional antenna.

* * * * *